United States Patent
McGuffin

(10) Patent No.: US 7,010,651 B2
(45) Date of Patent: Mar. 7, 2006

(54) SYSTEM AND METHOD FOR USING REMOVABLE STORAGE FOR COMPUTER TROUBLESHOOTING

(75) Inventor: Thomas F. McGuffin, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 396 days.

(21) Appl. No.: 10/603,075

(22) Filed: Jun. 23, 2003

(65) Prior Publication Data

US 2004/0059865 A1  Mar. 25, 2004

Related U.S. Application Data

(60) Provisional application No. 60/390,583, filed on Jun. 21, 2002.

(51) Int. Cl.
*H04L 13/08* (2006.01)
*H04L 29/08* (2006.01)

(52) U.S. Cl. ............................. 711/156; 714/6; 718/100
(58) Field of Classification Search ................. 711/156
See application file for complete search history.

(56) References Cited

FOREIGN PATENT DOCUMENTS

| JP | 03026136 A | * | 2/1991 |
| JP | 08163178 A | * | 6/1996 |
| JP | 2004104254 A | * | 4/2004 |

* cited by examiner

*Primary Examiner*—B. James Peikari
(74) *Attorney, Agent, or Firm*—Black Lowe & Graham PLLC

(57) ABSTRACT

A computer system monitoring apparatus that collects various system and operating parameters to a removable memory unit. The system includes an operating system controlling at least one process along with a memory for executing operation instructions and a permanent memory storage coupled to the computer. The system monitors the status of a process within the computer, including the process state and any events that occur to alter the state. The system logs the status data of the process within the computer upon a change in the status of the process, accumulates the status data, and writes the status data to the memory storage in a manner to always maintain the most recent system status information on the memory storage. When a fault in the computer system occurs, the memory unit can be retrieved, and the data thereon is used to troubleshoot the fault.

7 Claims, 5 Drawing Sheets

SYSTEM AND METHOD FOR USING REMOVABLE STORAGE FOR COMPUTER TROUBLESHOOTING

PRIORITY CLAIM

This application claims the benefit of U.S. Provisional Application Ser. No. 60/390,583 filed Jun. 21, 2002.

FIELD OF THE INVENTION

This invention relates generally to computer hardware and software diagnostic troubleshooting and, more specifically, to a system and method for using removable storage to facilitate computer troubleshooting.

BACKGROUND OF THE INVENTION

Lack of data and information make troubleshooting complex remote software intensive systems extremely difficult or impossible. In most cases, the problem is only found if the troubleshooter happens to make a good guess regarding the nature of the problem. Many problems involving computer hardware and software remain unsolved years after being reported due to insufficient data concerning operating parameters, operating history, and computer status at the time of the problem.

Thus, there is a need for a system and method for accumulating information pertaining to the operating parameters, operating history and computer status immediately prior to hardware or software failure that will facilitate diagnostic evaluation by system troubleshooters.

SUMMARY OF THE INVENTION

The present invention is a computer system monitoring apparatus that collects various system and operating parameters to a removable memory unit. When a fault in the computer system occurs, the memory unit can be retrieved, and the data thereon is used to troubleshoot the fault.

More specifically, the preferred embodiment of the present invention includes a computer having an operating system controlling at least one, process comprising a sequence of states of operation, along with a memory, coupled to the computer. The memory contains stored program instructions used to carry out aspects of the present invention. The present invention further includes a memory storage coupled to the computer, the memory storage capable of permanently storing data from the computer. The system monitors the status of a process within the computer, including the process state and any events that occur to alter the state. The system methodology logs the status data of the process within the computer upon a change in the status of the process, accumulates the status data, and writes the status data to the memory storage in a manner to always maintain the most recent system status information on the memory storage.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
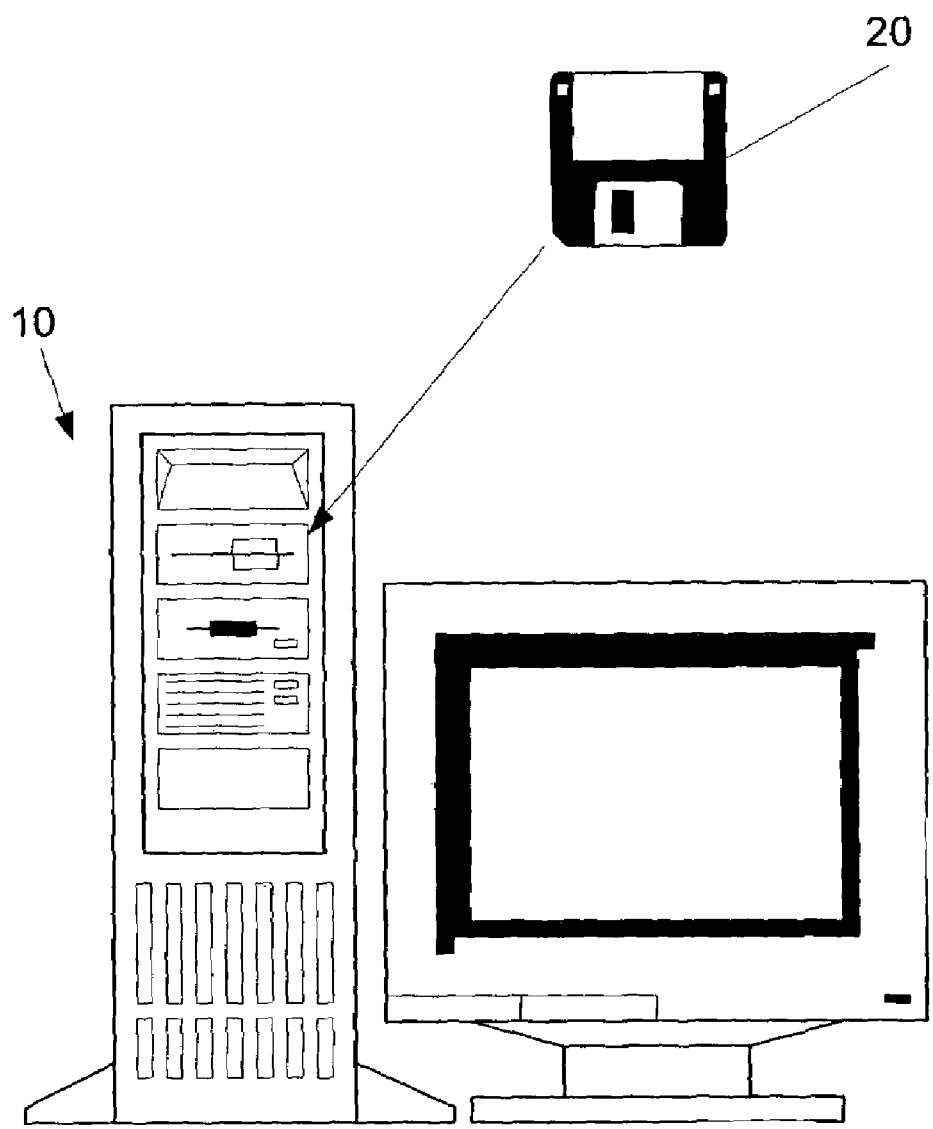
FIG. 1 is an illustration of a computer and removable memory storage unit in accordance with the present invention.

The present invention is directed to a system and method for using removable memory storage to accumulate information pertaining to computer hardware or software operating parameters, operating history and computer status immediately prior to hardware or software failure. The present invention provides significant advantages in hardware and software diagnostic evaluation by system troubleshooters Referring to FIG. 1, the present invention comprises a computer 10 incorporating a removable memory storage unit 20. The removable memory storage unit may be any type of storage, including magnetic removable storage (e.g., floppy disks, cassette tapes, Zip drives, USB hard drives and microdrives); optical removable storage (e.g., CD ROMs and DVDs); and solid state removable storage, or devices that have no moving parts (e.g., multimedia cards, memory sticks, SmartMedia cards, CompactFlash and Secure Digital cards). The storage is preferably easily removable in nature to best facilitate extraction of data stored on the medium for use in other computer systems. However, any type of memory storage amenable to removal from one system and integration with a different system that allows stored data to be viewed on the subsequent system is within the scope of the present invention. The preferred embodiment uses a PCMCIA card.

Figure 2:
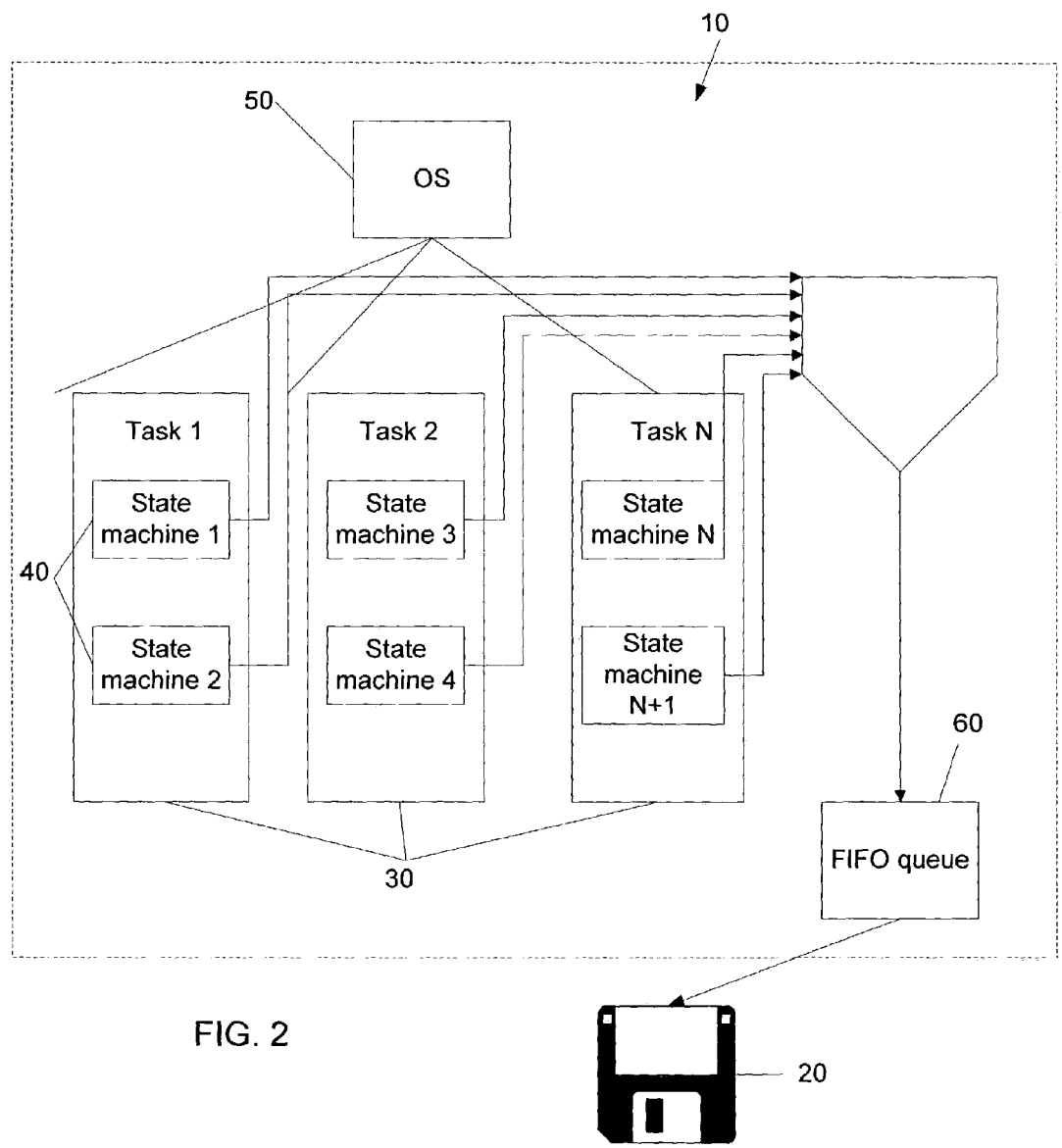
FIG. 2 is an exemplary block diagram of the present invention.

FIG. 2 is an illustration of the interrelationship of the internal structural and functional components of computer 10 of the present invention. Referring to FIG. 2, in the preferred embodiment, each software process or task 30 running on the computer includes one or more state machines 40, each representing a set of states. An operating system 50 controls the operations of each of the tasks 30, as well as funnels data associated with each task 30 and each state machine 40 to the removable storage 20. In the preferred embodiment, every software process or task 30 contains a module or other system function that gathers internal data on the state and status of the process or task. This data is referred to herein as status data. The status data uniquely identifies the software process from where the data originated. The status data indicates the state of the software process, such as, but not limited to, power on, idle, waiting for data input, sent message, waiting for response or invalid data received. Events that cause state changes are also preferably recorded, such as, but not limited to, data entered, message received or message format invalid. The data from every software process or task is sent to a data logging function which time stamps the data, merges the data from all of the software processes and writes the data to the removable storage.

Figure 3:
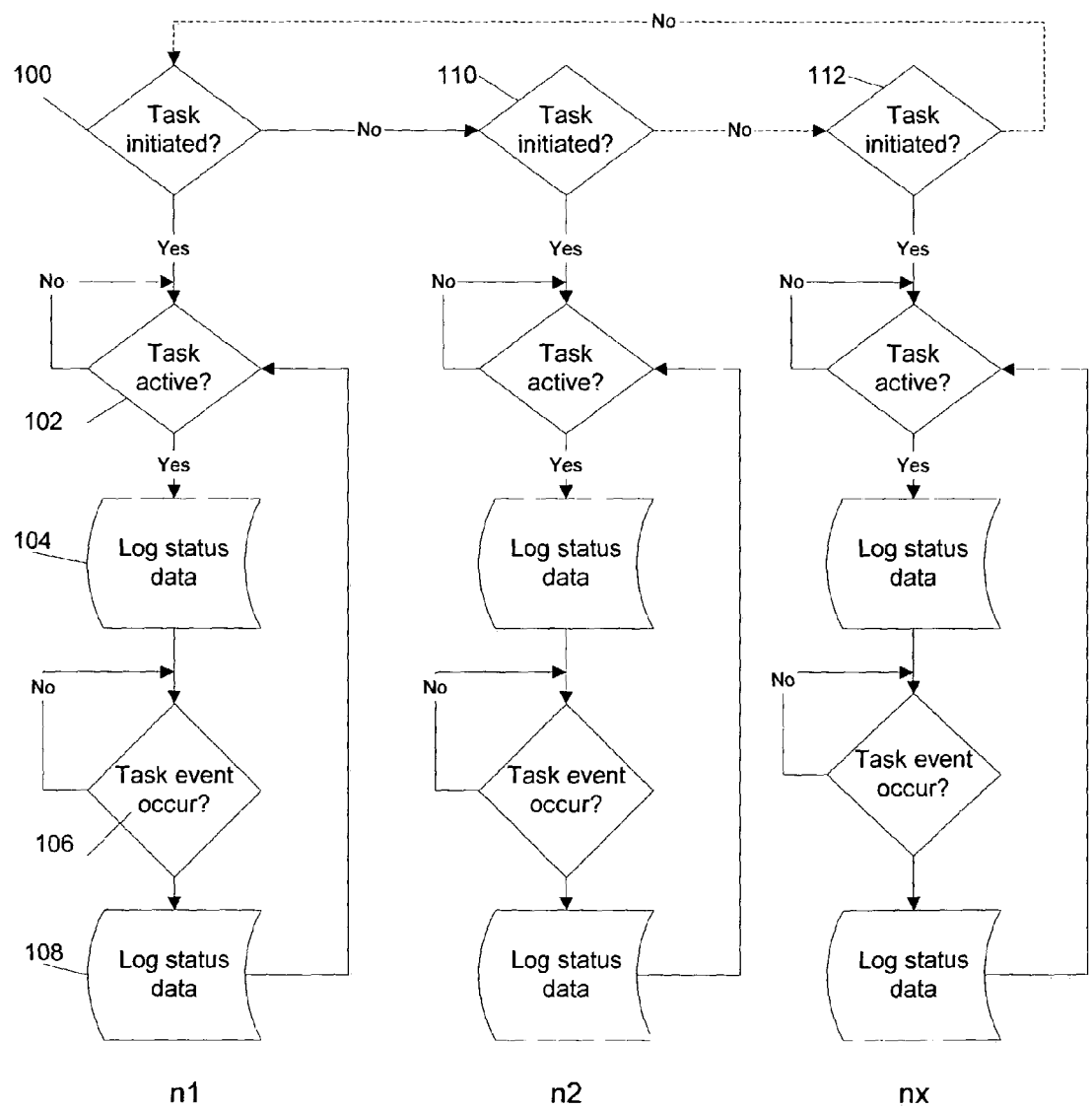
FIG. 3 is a flowchart of the operational logic of the data accumulation aspect of the present invention.

The operation of the status data accumulation aspect of the present invention is better understood with reference to FIG. 3. At decision block 100, the operating system (or other assigned processing component) determines whether a given task has been initiated. If the task has been initiated, the logic proceeds to decision block 102. At decision block 102, the operating system determines whether the initiated task is active. If the task is not active, the operation enters a holding pattern until the task has been activated. In an alternative embodiment, a timed-out status check (not shown) may be triggered if no activity occurs for an initiated task after a predetermined period of time, at which point the logic would return to decision block 100.

If the task is active, the logic proceeds to block 104, where the status data is logged. See FIG. 4 and the accompanying description below for more detail of this step. At this block, the status data preferably includes at a minimum the state of the task. The logic then proceeds to decision block 106. At decision block 106, the operating system determines whether a task event has occurred. If not, the operation again enters a holding pattern until an event triggered further processing. In an alternative embodiment, a timed-out status check (not shown) may be triggered if no event occurs for a predetermined period of time, at which point the logic would proceed to block 108. If the operating system determines an event has occurred, the logic proceeds to block 108. At block 108, the status data is logged (see FIG. 4). At this block, the status data preferably includes both event information as well as current state information. After block 108, the logic proceeds back to decision block 102.

If at decision block 100 the task has not been initiated, the logic of the operation moves to decision block 110, which institutes the same procedure as outlined above for a different task. This operational logic can proceed for n additional tasks 112. The above-described logic can proceed either sequentially as described above, or in parallel as assigned operations of multiple operating system components.

The status data is preferably funneled to the removable storage 20 via a first-in, first-out (FIFO) queue 60, although the data may be directed to the removable storage using other priority schemes. The status data is written to the removable storage 20 in consecutive order, meaning that the most recent state data from the tasks managed by the operating system 50 is written to the next memory location on the removable storage.

The capacity of the removable storage 20 is variable but discrete. In the preferred embodiment, when the removable storage 20 is full of status data, new status data overwrites the oldest data. This creates a continuous queue of the most recent status state data from the tasks managed by the operating system 50. When a problem or system failure occurs, the removable storage 20 is removed from the computer 10 and the recent status data is analyzed in order to determine the sequence of events leading up to the event or events that caused the system problem or failure. Because many computer and software problems are caused by the interaction of the various components and the stimulus received, the present invention is particularly useful in complex remote software intensive systems. Having a comprehensive picture of the sequence of events that lead up to the problem improves the troubleshooter's ability to reproduce the sequence of events that caused the problem. Once the problem is reproduced, then it is much easier to find a solution and test the solution.

Figure 4:
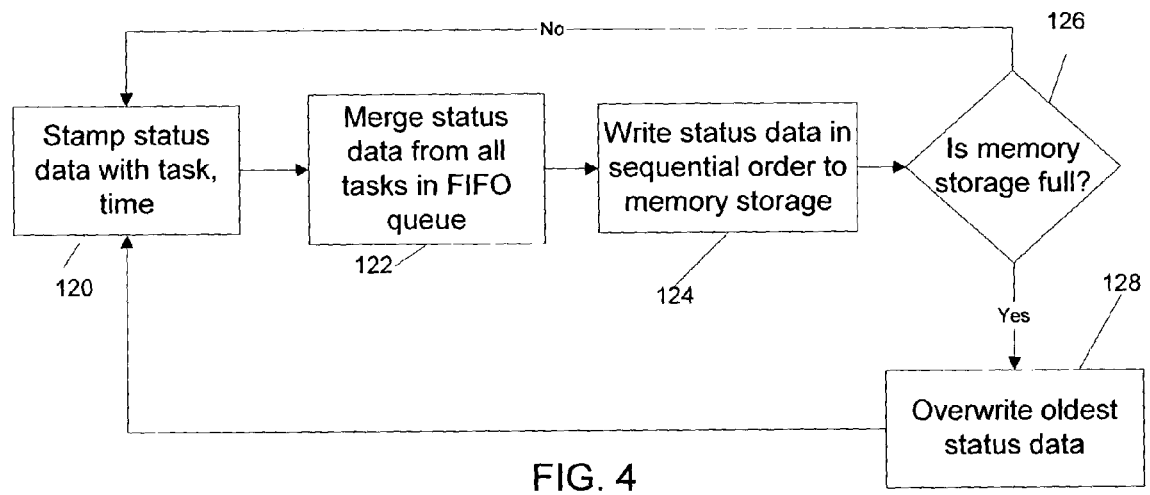
FIG. 4 is a flowchart of the operational logic of the removable memory storage aspect of the present invention.

The operation of the data accumulation and storage aspect of the present invention is better understood with reference to FIG. 4. At block 120, when the log status data block operation of FIG. 3 is invoked, the system preferably stamps the status data (including state and/or event information) with the task identification as well as the time and date. Other information may easily be added according to system demands. At block 122, the stamped status data from each task is preferably merged together in a FIFO queue, thereby maintaining in order the most recent events and state changes. At block 124, the status data is written in sequential order to the removable storage 20. At decision block 126, a determination is made whether the removable storage is full. If not, the operational logic returns to block 120 to process additional status data. If the removable storage is full, the logic proceeds to block 128, where the most recent status data overwrites the oldest status data, thereby preserving the most up-to-date system information in the event of a problem or failure.

Figure 5:
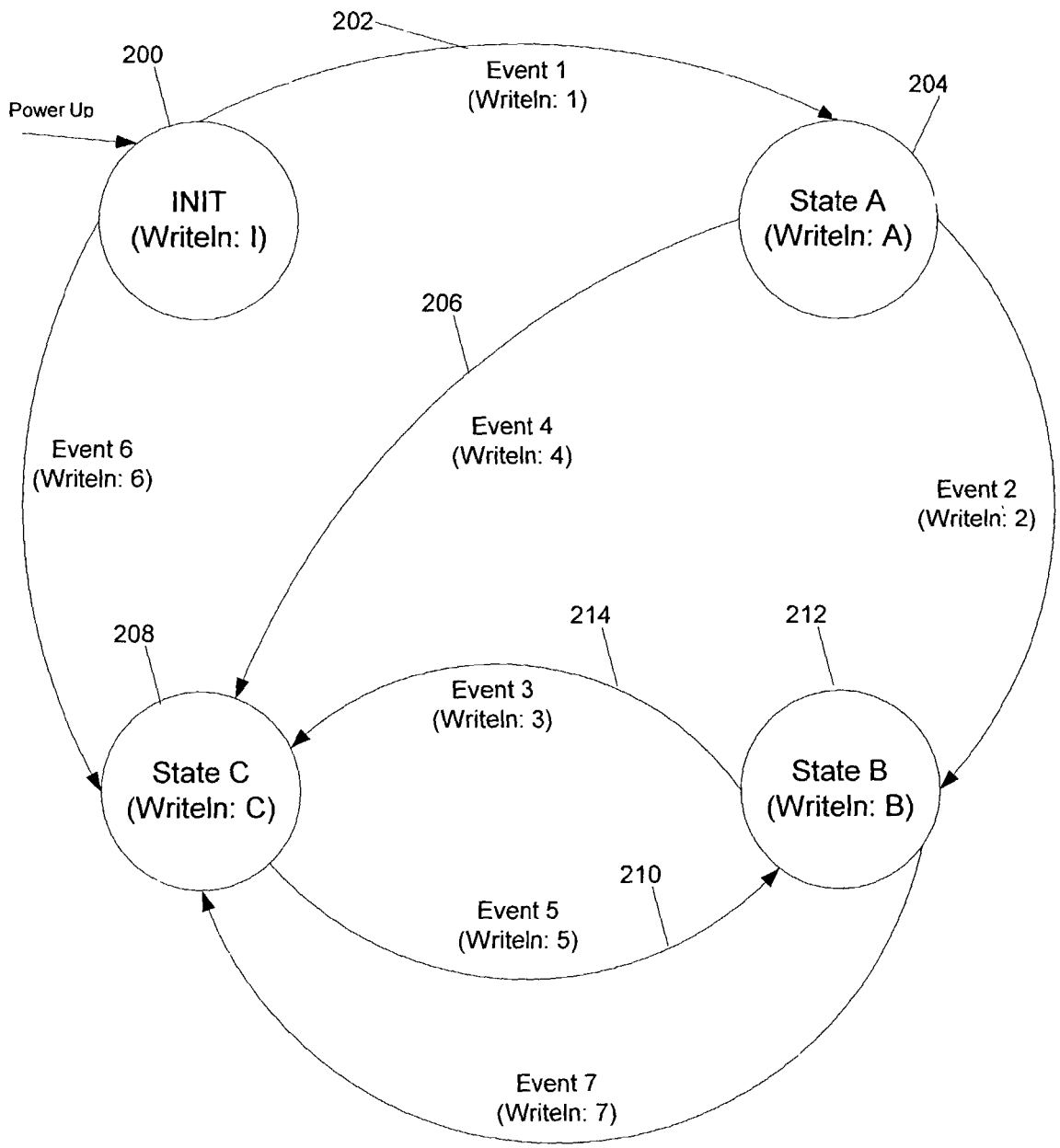
FIG. 5 is an illustration of an exemplary state machine operational detail.

The operation of the preferred embodiment of the present invention is better understood by reference to FIG. 5, which illustrates one possible process by which a given task moves from state to state via events. By way of example, the status data for state machine XYZ may be recorded to the removable storage 20 in order shown below in Table 1:

TABLE 1

| | |
|---|---|
| Power up | XYZ: I (200) |
| Event 1 occurs | XYZ: 1 (202) |
| State A | XYZ: A (204) |
| Event 4 occurs | XYZ: 4 (206) |
| State C | XYZ: C (208) |
| Event 5 occurs | XYZ: 5 (210) |
| State B | XYZ: B (212) |
| Event 3 occurs | XYZ: 3 (214) |
| State C | XYZ: C (208) |

Assuming a problem related to state C, a troubleshooter may find it useful to know how the task reached state C. In this example, with reference to FIG. 3, there are four possible ways of arriving at state C, shown below in Table 2:

TABLE 2

| | | |
|---|---|---|
| Init | → | C (via event 6) |
| A | → | C (via event 4) |
| B | → | C (via event 3) |
| B | → | C (via event 7) |

Heretofore, it would require trial-and-error to determine which path led to the problem.

The present invention overcomes this disadvantage by providing the system and method of accumulating the processing information in a manner facilitating efficient review in order to isolate the cause of the system problem or failure. In this example, the status data recorded in the removable storage 20, shown in Table 1, indicates the data necessary to resolve which path Was taken to arrive in state C immediately preceding the system problem or failure.

The present invention provides the same advantages in system incorporating multiple tasks and state machines. By way of example, Table 3 shows the status data for state machines XYZ1 and XYZ2 as recorded to the removable storage 20.

TABLE 3

| DATA RECORDED |
|---|
| XYZ1: I |
| XYZ2: I |
| XYZ1: 1 |
| XYZ2: 1 |
| XYZ1: A |
| XYZ2: A |
| XYZ1: 4 |

TABLE 3-continued

DATA RECORDED

XYZ1: A
XYZ1: 5
XYZ1: B
XYZ2: 2
XYZ2: B

In this example, the status data is tagged not only to identify the particular state or event, but also to uniquely identify its originating state machine. In this example, both instances of state machine XYZ end up in state B, but do so via different paths. The recorded status data provides the troubleshooter with the precise path indicating how each state machine arrived in state B.

The present invention contemplates a variety of tools for use by the troubleshooter to facilitate diagnosis of the problem or system failure. Examples includes search algorithms for locating specific status data or sequences of data, as well as post processing routines that allowing formatting and tagging of the status data for later reference and analysis.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A system for accumulating information pertaining to the operating parameters, operating history and status of computers for use in diagnostic evaluation, comprising:
    a computer having an operating system controlling at least one process, the process comprising a sequence of states of operation;
    a memory storage coupled to the computer, the memory storage capable of permanently storing data from the computer;
    a memory, coupled to the computer, the memory containing stored program instructions executable by the computer, comprising:
        monitoring the status of a process within the computer;
        logging the status data of a process within the computer upon a change in the status of a process;
        accumulating the status data, wherein status data is accumulated in a first-in, first-out queue; and
        writing the status data to the memory storage.

2. The system of claim 1, wherein the memory storage coupled to the computer is a removable memory storage device.

3. A method for accumulating information pertaining to the operating parameters, operating history and status of computers for use in diagnostic evaluation, comprising:
    monitoring the status of a task within a computer;
    if the task is active, logging the status data of the task within the computer;
    if an event occurs related to the task, logging any change in the status of the task caused by the event;
    accumulating the status data, wherein status data is accumulated in a first-in, first-out queue; and
    writing the status data to a memory storage coupled to the computer.

4. The method of claim 3, wherein the memory storage coupled to the computer is a removable memory storage device.

5. A method for accumulating information pertaining to the operating parameters, operating history and status of computers for use in diagnostic evaluation, comprising:
    monitoring the status of a plurality of tasks within a computer;
    if a task is active, logging the status data of the task within the computer;
    if an event occurs related to an active task, logging any change in status of the task caused by the event;
    accumulating the status data for each active task;
    merging the status data for a plurality of active tasks in a first-in, first-out queue;
    writing the status data to a memory storage coupled to the computer.

6. The method of claim 5, wherein logging the status data of the task within the computer comprises noting the unique identification of the active task and the time the status data is presented.

7. The method of claim 5, wherein the memory storage coupled to the computer is a removable memory storage device.

* * * * *